UNITED STATES PATENT OFFICE.

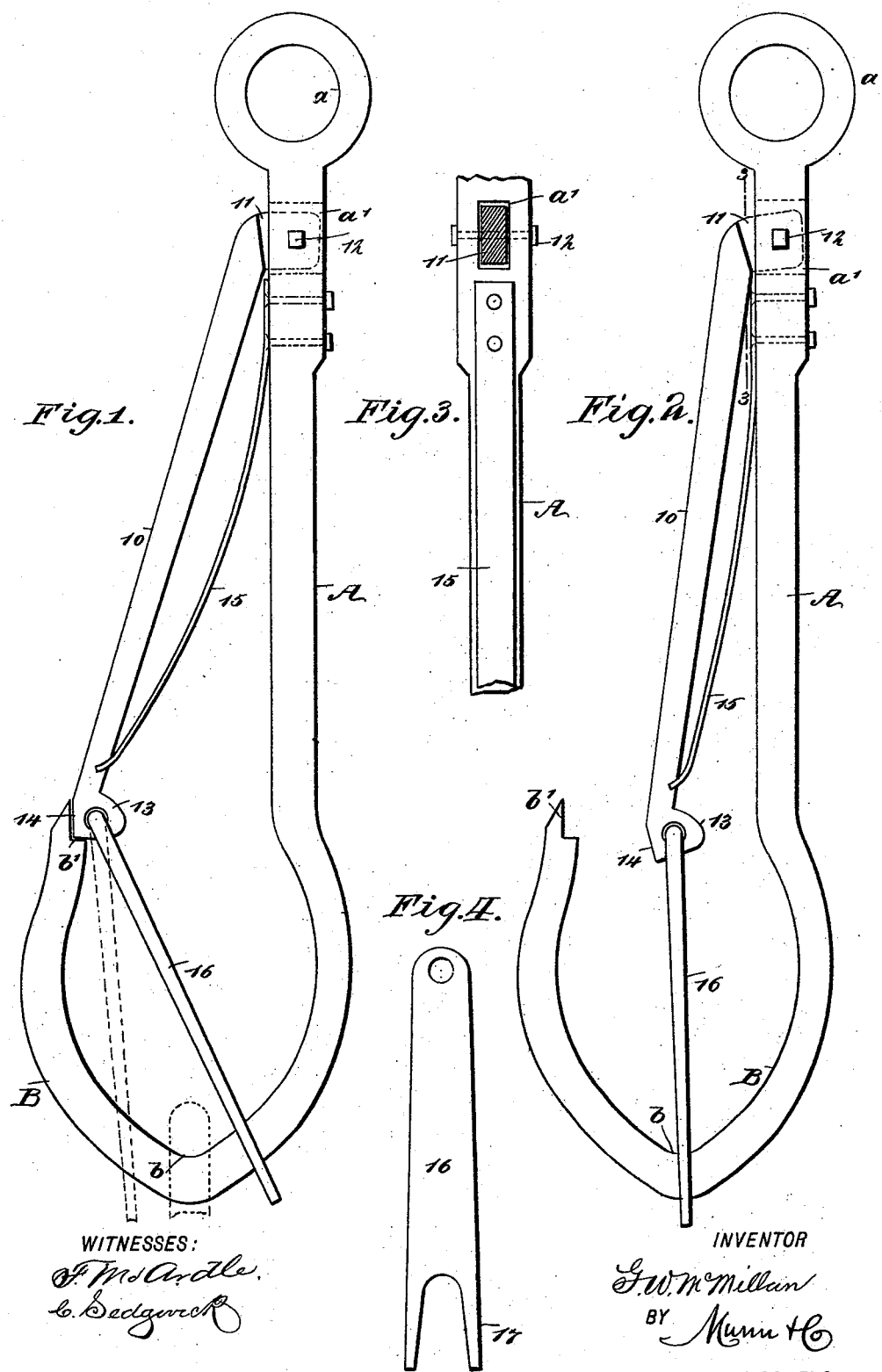

GEORGE W. McMILLAN, OF HURLETON, CALIFORNIA.

HOOK.

SPECIFICATION forming part of Letters Patent No. 516,897, dated March 20, 1894.

Application filed June 22, 1893. Serial No. 478,534. (No model.)

*To all whom it may concern:*

Be it known that I, GEORGE W. MCMILLAN, of Hurleton, in the county of Butte and State of California, have invented a new and useful Improvement in Hooks, of which the following is a full, clear, and exact description.

My invention relates to an improvement in hooks, especially adapted for lifting purposes, and particularly adapted for use in hoisting buckets or like articles, in the shafts of mines, and the object of the invention is to provide a hook of this character which will be exceedingly simple, durable and economic, and to which the article to be hoisted may be expeditiously and conveniently applied; and whereby after the article has been applied to the hook it may be swung in any desired direction, and practically upturned without the article becoming disconnected from the hook.

A further feature of the invention is to provide a means whereby when the article carried by the hook shifts from any cause whatever, it will simply hold the fastening devices more closely in place.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the hook in its closed position. Fig. 2 is a similar view of the hook, representing it open or as in position to receive the article to be carried thereby. Fig. 3 is a section taken practically on the line 3—3 of Fig. 2; and Fig. 4 is a detail view of a safety catch used in connection with the hook.

In carrying out the invention the body of the hook comprises a shank A, which terminates at its lower end in the hook proper B. The hook is substantially of somewhat oval contour, it being widest at its center and terminating at its lower central portion in a decided depression $b$, shown in both Figs. 1 and 2. The top portion of the hook is open, and its upper free end is provided with a shoulder $b'$, produced in its inner face. The shank A, terminates at its upper end preferably in an eye $a$, and below the eye a slot $a'$, is produced in the shank, as best shown in Fig. 3, which slot extends from the front to the back of the shank.

In connection with the shank and its hook a tongue 10 is employed. This tongue is provided at is upper end with a head or tenon 11, located practically at right angles to the body, and this head or tenon is loosely entered in the slot $a'$ in the shank of the hook, and is pivoted therein by a pin or bolt 12 or the equivalent thereof. The lower end of the tongue 10 is provided with an enlargement 13 upon its inner face, and the outer end of the enlarged surface is inclined, as shown at 14, and the outer and lower portion of the tongue enlargement 13 is so shaped that this portion of the tongue may neatly fit in the recess $b'$ of the hook, as shown in Fig. 1. In fact, the lower end of the tongue is normally held in the said hook recess through the medium of a spring 15, which is firmly secured at is upper end to the shank below the opening $a'$ therein, and the spring is made to face the inner edge of the tongue. The lower end of the spring is preferably bifurcated in order that the members thus formed may extend from opposite sides of the tongue, as shown in both Figs. 1 and 2. The free end of the spring engages with the tongue at a point near its lower end. As has heretofore been stated, the spring forces the tongue 10 to normally close the hook, and an object can not be entered upon the hook until the tongue has been pressed inward.

In order to effectually hold the tongue in its closed position yet provide for its being carried to an open position, and further in order to prevent the object once placed upon the hook from accidentally leaving it, and also in order to protect the spring 15, I employ what I term a combined safety catch and spring-protector 16. This safety catch and spring-protector consists of a metal plate or bar which at its upper end has pivotal connection with the lower or enlarged end of the tongue 10, while in the lower end of the strip or bar a recess 17, is produced, bifurcating the said lower end; and the recess 17, is adapted to receive the body portion of the hook, the members at each side of the recess extending beyond the lower edge of the hook at opposite sides. When the tongue is in its closed position the combined catch and protector will gravitate to the position shown in dotted lines in Fig. 1, and will lock the tongue in its closed position. When the tongue is pressed inward to its open position, shown in Fig. 2, the combined catch and protector will assume a vertical central position in the hook, and will be located over its lower depressed surface $b$, thus enabling the bail of a bucket or other object to be entered over the free end of the hook to an engagement with the body thereof; and as the bail or other object located upon the hook settles in the depression $b$, the combined catch and protector will be thrown to the rear of the hook, occupying the rearward diagonal position shown in full lines in Fig. 1, and in this position the catch and protector will also effectually lock the tongue in its closed position.

It will be observed that the catch and protector will prevent the bail or other object carried by the hook from reaching the spring 15, and therefore protects the spring, while at the same time in the event a bucket carried by the hook should in its ascent strike against an obstruction in such manner as to upturn the hook, the bail of the bucket sliding up the hook will by striking the upper portion of the catch and protector serve only to force the latter into a better locking engagement with the hook, and the bail will therefore be effectually prevented from leaving the hook. In fact no matter in what direction the bucket may be turned, its bail cannot leave the hook and will only tend to force the catch and protector to a firm locking engagement between the hook and the tongue.

Having thus described my invention, I claim as new and desire to secure by Letters Patent—

1. As an improved article of manufacture, a hook for the purpose described, the same comprising a hook, a shank, a spring-controlled tongue carried by the shank and having locking or closing engagement with the hook, and a latch pivoted to and pendent from the lower portion of the tongue and in constant engagement with the hook, which latch serves to maintain the tongue in a locked or closed position and protects the spring of the tongue, as and for the purpose set forth.

2. As an improved article of manufacture, a hook, the same comprising a shank, and a hook of substantially oval interior contour, the hook being provided with a recess at its free end, a tongue pivotally connected with the shank, a spring exerting outward tension upon the tongue, the lower end of the tongue being fitted to enter the recess in the hook in which it is normally held by the spring, and a latch pivotally connected with the tongue and engaging with the inner wall of the hook, which latch acts to maintain the tongue in its locked or closed position yet permits of free inward movement of the tongue and serves likewise as a protector for the spring of the tongue, as and for the purpose set forth.

3. In a hook, the combination, with a shank and a hook connected with the shank, the hook having essentially an oval interior shape, the free end of the hook being also provided with a recess in its inner face, of a tongue pivotally connected with the shank, the lower end of which tongue is fitted to enter the recess in the hook, a spring attached to the shank, normally forcing the tongue to locking or closing engagement with the hook, and a latch pivotally connected with the lower end of the tongue, which latch is bifurcated at its lower end, engaging with the inner surface of the hook and extending beyond its side and lower surfaces, the latch being made of sufficient length to bind against the sides of the hook and having free movement over the bottom thereof, as set forth.

GEORGE W. McMILLAN.

Witnesses:
H. G. BRADLEY,
JNO. P. LEONARD.